United States Patent

Dorsey et al.

[19]

[11] Patent Number: 5,809,544
[45] Date of Patent: Sep. 15, 1998

[54] MICROCONTROLLER WHICH LIMITS ACCESS TO INTERNAL MEMORY

[75] Inventors: Donald A. Dorsey, Vernon Hills; Joseph M. Hansen, Lake Villa, both of Ill.

[73] Assignee: Motorola, Inc., Schaumburg, Ill.

[21] Appl. No.: 730,188

[22] Filed: Oct. 15, 1996

Related U.S. Application Data

[63] Continuation of Ser. No. 539,914, Oct. 6, 1995.

[51] Int. Cl.⁶ .................................................. G06F 5/06
[52] U.S. Cl. ................ 711/163; 340/825.34; 395/187.01
[58] Field of Search .............................. 395/186, 187.01, 395/182.06, 185.06, 490, 491; 711/163, 164, 156; 380/23, 24, 25; 235/375–382.5; 340/825.34, 825.3, 825

[56] References Cited

U.S. PATENT DOCUMENTS

| | | | |
|---|---|---|---|
| 4,087,856 | 5/1978 | Attanasio | 395/186 |
| 4,211,919 | 7/1980 | Ugon | 235/487 |
| 4,590,552 | 5/1986 | Guttag et al. | 711/163 |
| 4,698,750 | 10/1987 | Wilkie et al. | 395/490 |
| 4,958,276 | 9/1990 | Kiuchi et al. | 711/167 |
| 5,012,410 | 4/1991 | Ueda | 711/3 |
| 5,014,191 | 5/1991 | Padgaokar et al. | 395/490 |
| 5,016,212 | 5/1991 | Yamaguchi et al. | 395/800.3 |
| 5,019,970 | 5/1991 | Yamaguchi et al. | 395/442 |
| 5,067,077 | 11/1991 | Wakimoto et al. | 395/400 |
| 5,088,023 | 2/1992 | Nakamura et al. | 395/425 |
| 5,134,700 | 7/1992 | Eyer et al. | 711/164 |
| 5,168,559 | 12/1992 | Tamura | 711/167 |
| 5,210,841 | 5/1993 | Johnson | 711/3 |
| 5,247,621 | 9/1993 | Gulick | 395/281 |
| 5,251,304 | 10/1993 | Sibigtroth et al. | 395/490 |
| 5,276,839 | 1/1994 | Robb et al. | 395/425 |
| 5,278,962 | 1/1994 | Masuda et al. | 711/267 |
| 5,305,460 | 4/1994 | Kaneko et al. | 711/163 |
| 5,333,295 | 7/1994 | Podkowa | 395/421.01 |
| 5,379,443 | 1/1995 | Padgaonkar et al. | 395/800.43 |
| 5,404,547 | 4/1995 | Diamanstein et al. | 395/775 |
| 5,432,950 | 7/1995 | Sibigtroth | 395/490 |
| 5,452,431 | 9/1995 | Bournas | 395/442 |
| 5,557,743 | 9/1996 | Pombo et al. | 395/186 |
| 5,600,818 | 2/1997 | Weikman et al. | 395/490 |

FOREIGN PATENT DOCUMENTS

| | | |
|---|---|---|
| 56-94451 | 7/1981 | Japan . |
| 57-45636 | 3/1982 | Japan . |
| 63-41163 | 2/1988 | Japan . |
| 63-76095 | 4/1988 | Japan . |
| 63-163929 | 7/1988 | Japan . |
| 2-219149 | 8/1990 | Japan . |
| 3-135641 | 6/1991 | Japan . |
| 5-46473 | 2/1993 | Japan . |
| 6-12321 | 1/1994 | Japan . |

*Primary Examiner*—Larry D. Donaghue
*Attorney, Agent, or Firm*—Randall S. Vaas

[57] ABSTRACT

A microcontroller (100) with an expansion port (112) includes internal ROM (110) and EEPROM (109) and an external expansion port. The EEPROM internal to the microcontroller is programmable only when the CPU (102) is executing instructions within the internal ROM. Additionally, instructions associated with a secure operation stored in the internal ROM may not be accessed without first executing the beginning instruction of the secure operation. Attempts to begin execution of the secure operation at any point other than the legal entry address will cause the internal ROM (110) to be disabled.

11 Claims, 5 Drawing Sheets

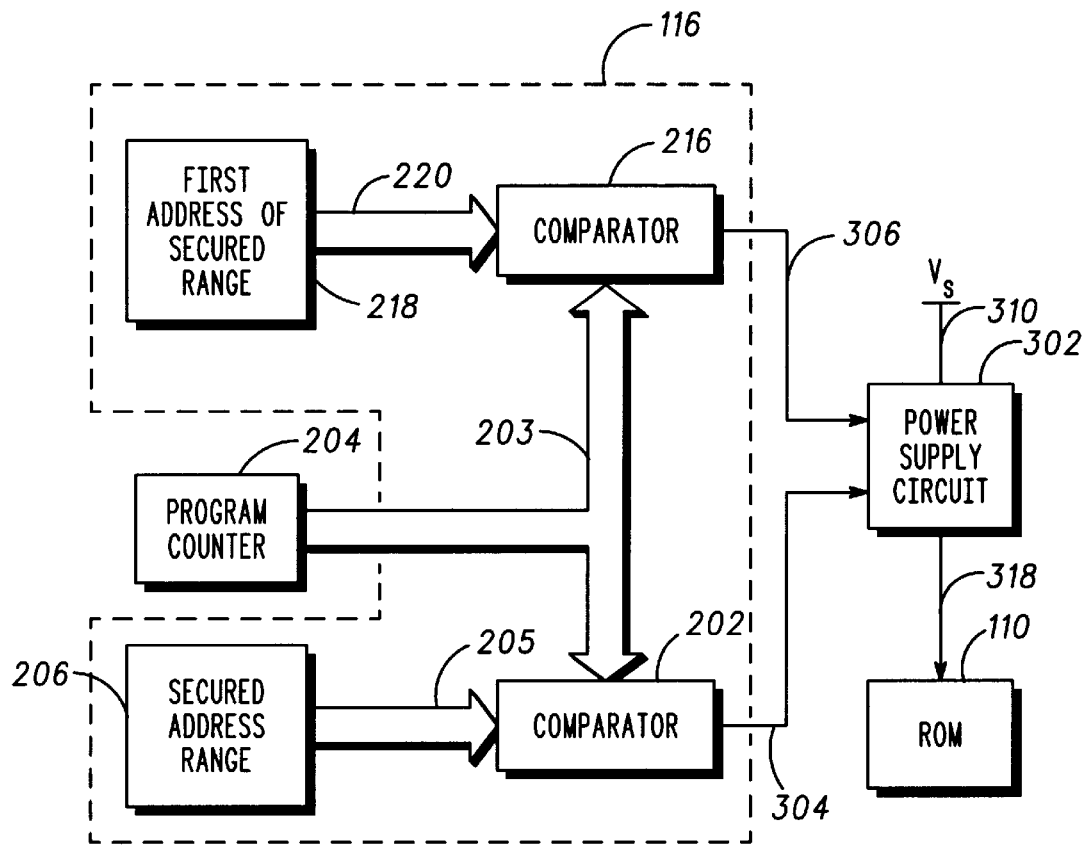
*FIG.3*
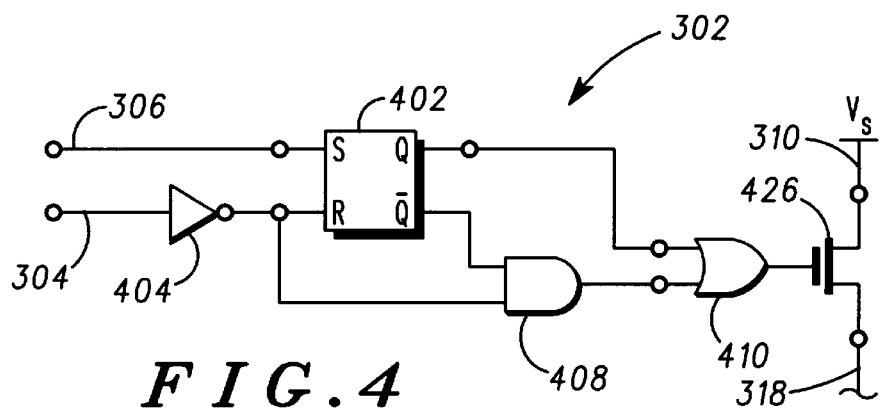
*FIG.4*
| S | R | $Q_{nt}$ |
|---|---|---|
| 0 | 0 | $Q_n$ |
| 0 | 1 | 0 |
| 1 | 0 | 1 |
| 1 | 1 | x |
*FIG.5*

MICROCONTROLLER WHICH LIMITS ACCESS TO INTERNAL MEMORY

This is a continuation of application Ser. No. 08/539,994, filed Oct. 6, 1995, now abandoned.

FIELD OF THE INVENTION

The present invention pertains to data processors, and more particularly to security features for microcontrollers having an external access port.

BACKGROUND OF THE INVENTION

Microcontrollers are integrated circuits which incorporate on-chip several of the elements associated with computer systems including a central processing unit (CPU), random access memory (RAM), read only memory (ROM), and peripherals. The nonvolatile memory is used to store the operating program for the CPU. Often, the on-chip nonvolatile memory is large enough to incorporate all of the microcontroller's program. In this case, the microcontroller need not access off-chip memory to operate. Occasionally the program is too large to fit in the on-chip nonvolatile memory and the microcontroller must be able to fetch part of the program off-chip. To allow for this possibility, typical microcontrollers have what is known as an expansion bus, that is a bus with address and data lines that allows external memory or memory-mapped peripherals to be accessed.

It is often desirable to have security features built into the microcontroller to prevent "hackers" from gaining knowledge of the on-chip program. For example, U.S. Pat. No. 4,698,750 invented by Wilkie et al. and assigned to the assignee hereof teaches a microcomputer with a security mode which when entered prevents the contents of nonvolatile memory from being read by an external source. Another technique taught by Sibigtroth et al. in U.S. Pat. No. 5,251,304 and assigned to the assignee hereof is useful when the microcontroller is operating with an expansion bus. U.S. Pat. No. 5,251,304 teaches a microcontroller with a secure mode in which off-chip instruction accesses are disabled. This technique is useful when the on-chip nonvolatile memory is sufficiently large to store all of the operating program. When the operating program is so large that it cannot be stored in a practically-sized on-chip nonvolatile memory, however, a new problem results. For example, a hacker could rewrite segments of the external portion of the program to cause the CPU to read out the contents of the internal nonvolatile memory.

Thus, a microcontroller with improved security is desired.

BRIEF DESCRIPTION OF THE DRAWINGS

FIG. 3 is a circuit schematic in block diagram form illustrating an alternate embodiment of security logic;

FIG. 4 is a circuit schematic illustrating the power supply circuit for the circuit according to FIG. 3;

FIG. 5 is a logic table for the RS flip flop of FIG. 4;

DETAILED DESCRIPTION OF THE DRAWINGS

Figure 1:
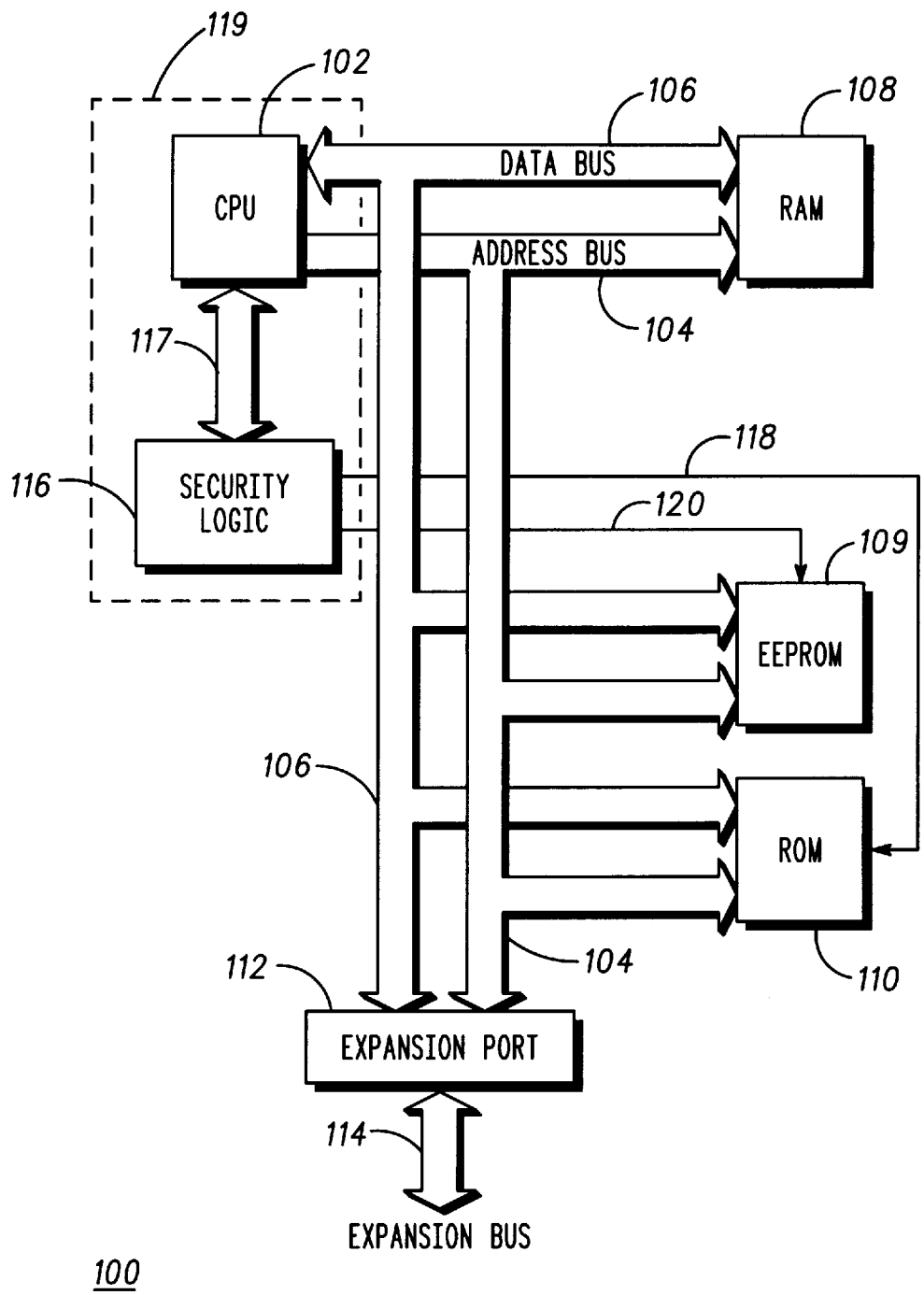
FIG. 1 is a circuit schematic in block diagram form illustrating a microcontroller having an expansion port.

A microcontroller has an expansion port coupled to an expansion bus. The microcontroller includes an internal ROM, RAM and electronically erasable read only memory (EEPROM), and the external expansion port coupled to an expansion bus. The internal EEPROM is programmable only when the CPU is executing instructions within the internal ROM. Additionally, instructions associated with a secure operation stored in the internal ROM may not be accessed without first executing the beginning instruction of the secure operation. Attempts to begin execution of the secure operation at any point other than the legal entry address, for example by JMPing, JSRing, RTSing, or RTIing into the secure operation at any other point, will cause the internal ROM to be disabled.

A microcontroller 100 (FIG. 1) is a single chip microcontroller including a central processing unit (CPU) 102 which provides address signals to an address bus 104, and communicates data bi-directionally via a data bus 106. Memories 108, 109, and 110 are connected to address bus 104 and data bus 106. The memories include a random access memory (RAM) 108, EEPROM 109 and a ROM 110. The operation of CPUs, RAMs, ROMs and EEPROMs are generally well-known to those skilled in the art, and will not be described in detail herein. In the present invention, some of the information stored on the EEPROM 109 includes secure data which may be altered under certain circumstances, and internal ROM 110 stores permanent operating instructions which are secure. For example, the secure EEPROM can only be read when the microcontroller is executing code from the internal ROM, and the secure internal ROM is readable only by the microcontroller when executing code from the internal ROM, as described in greater detail hereinafter.

An expansion port 112 allows microcontroller 100 to be connected to an external expansion bus 114. One situation in which it would be desirable to connect microcontroller 100 to an expansion bus is the situation in which EEPROM 109 or ROM 110 cannot be practically large enough to store the operating program. For example, EEPROMs on microcontrollers are typically limited in size to the range of 32–48 kilobytes (Kbytes), whereas some sophisticated application programs require sizes exceeding 100 Kbytes. These larger-sized programs cannot be practically implemented on-chip using available technology.

In order to allow program access to external memory connected to expansion bus 114 while still protecting the integrity of data in EEPROM 109 and internal ROM 110, microcontroller 100 includes security logic 116. Security logic 116 receives several control signals from CPU 102 on bus 117. The security logic outputs a ROM control signal on conductor 118, coupled to ROM 110, and an EEPROM control signal on conductor 120, coupled to EEPROM 109. The ROM and EEPROM control signals selectively enable or disable ROM 110 and EEPROM 109, respectively. The CPU 102 and the security logic 116 form an internal controller 119, for the microcontroller. The security logic 116 may be implemented by software or using circuitry external to the CPU.

In operation, the security logic 116 disables accesses to EEPROM 109 when the CPU 102 is attempting to program EEPROM 109 while executing code external to the internal ROM 110, or external to the microcontroller 100. The security logic 116 also disables access to the internal ROM 110 when CPU 102 is attempting to execute code in ROM 110 associated with a secure operation without executing the instruction at the beginning address. Additionally, access to internal ROM 110 is disabled whenever code is being executed anywhere outside internal ROM 110.

Figure 2:
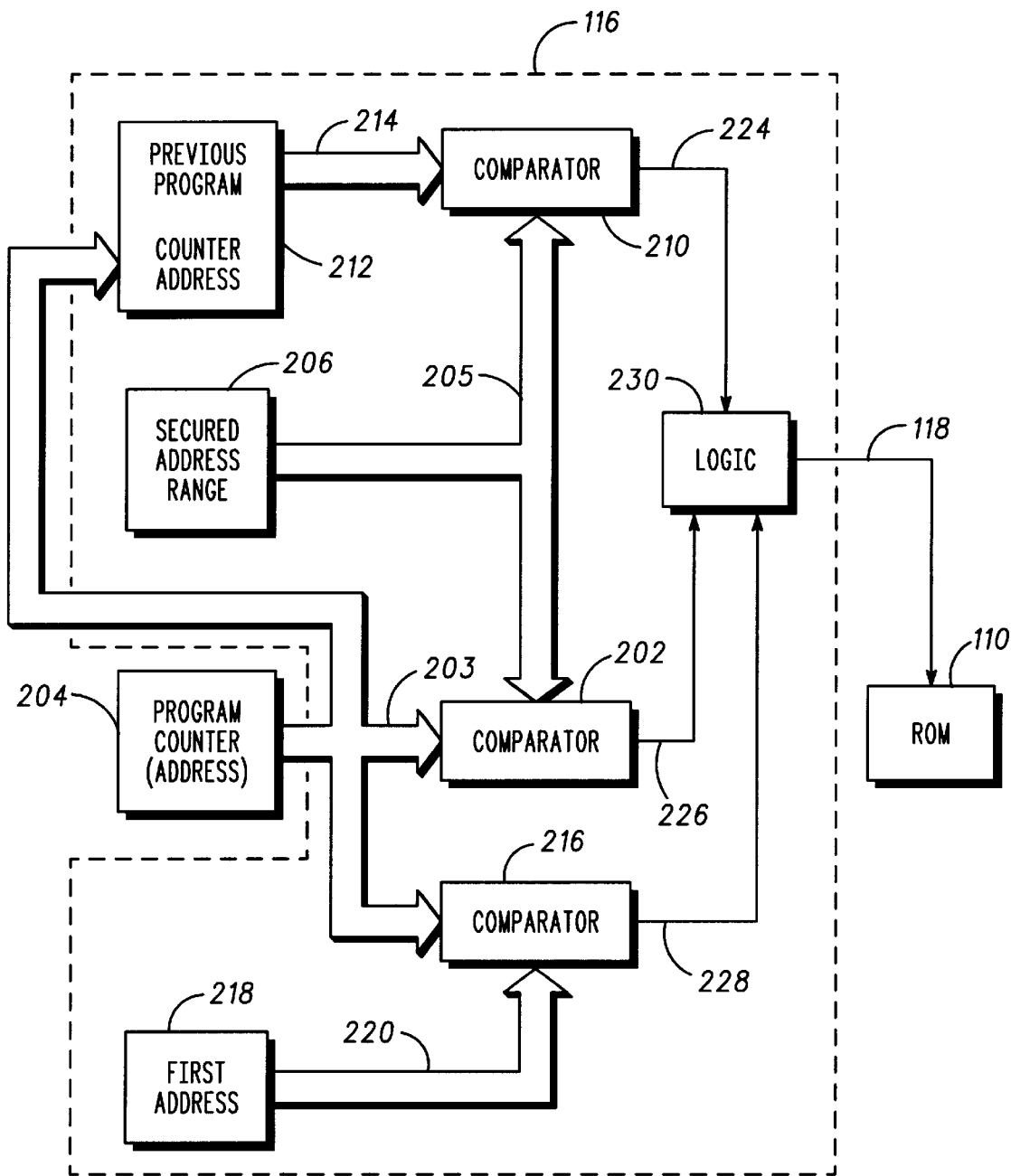
FIG. 2 is circuit schematic in block diagram form illustrating security logic for the microcontroller according to FIG. 1.
Figure 6:
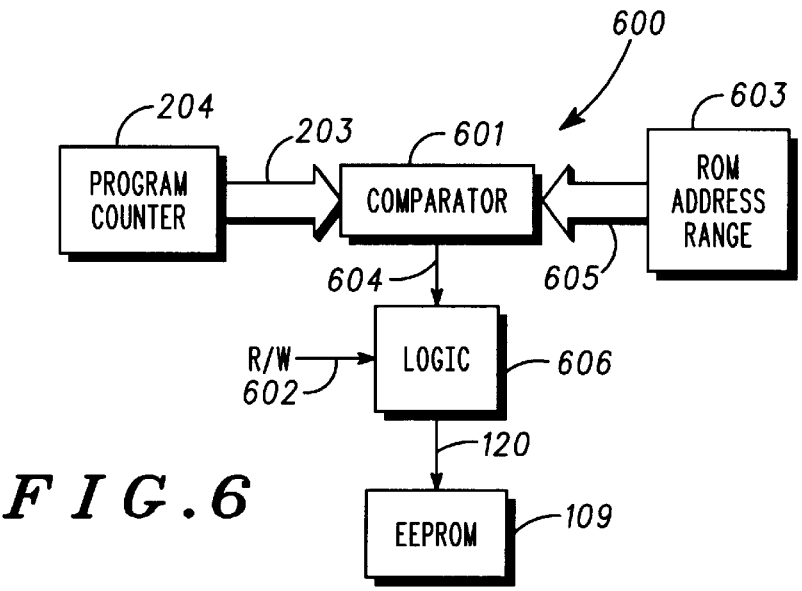
FIG. 6 is a circuit schematic in block diagram form illustrating another circuit in the security logic of FIG. 2.

To effect these security operations, the security logic 116 includes ROM security logic, shown in FIGS. 2–5, and EEPROM security logic, shown in FIG. 6. The ROM security logic includes a current address comparator 202 (FIG. 2). The current address comparator is coupled to a program counter 204 via a bus 203 and to a secured address range register 206 through bus 205. The program counter 204 is a register in commercially available microcontrollers that stores the address of the currently executing instruction. The secured address range register 206 stores the address range for a secured operation. For example, the secured address range register 206 stores a first address which is one less than the beginning address of the secured range and a second address that is one higher than the ending address of the secured operation, where the secured operation is stored at sequential address locations of the internal ROM 110. The current address comparator 202 compares the current address in the program counter 204 to the first address and second address in the secured address range register. If the program counter address is greater than the first address and less than the second address, the current address is determined to be in the secured address range. The current address comparator 202 outputs a high logic level signal if the current address is in the secured address range and a low logic level if it is not. If a plurality of address ranges are employed, a respective comparator is provided for each range. Those skilled in the art will recognize that the current address comparator 202 can be implemented using two magnitude comparator circuits and an ANDgate that logically combines the outputs of these magnitude comparators. It will also be recognized that the secured address range can be the entire address range for the internal ROM 110.

A previous address comparator 210 is coupled to the secured address range register 206 via bus 205 and to a previous program counter address register 212 via bus 214. The previous program counter address register 212 is a memory storing a single address, namely the previous program counter address. The previous program counter address register 212 is coupled to the program counter 204 via bus 203.

Each time the program counter changes from an old address to a new address, the old address from the program counter is stored in previous program counter address register 212. If the previous program counter address is in the secured address range, the previous address comparator 210 outputs a high logic level signal. The previous address comparator 210 otherwise outputs a low logic level signal. The previous address comparator 210 compares the address in previous program counter address register 212 to the secured address range, in the same manner as current address comparator 202 compares the program counter address to the secured address range, and thus will not be described again for brevity.

A first address comparator 216 is coupled to a first address register 218 via bus 220 and to program counter 204 via bus 203. The first address register 218 stores the first address of each secured operation that is stored in ROM 110. The first address comparator 216 compares the program counter address to the address, or addresses, stored in the first address register 218. If the program counter 204 address matches an address in the first address register 218, the first address comparator 216 outputs a high logic level. The first address comparator otherwise outputs a low logic level.

A logic circuit 230 is coupled to the output of previous address comparator 210 through conductor 224, the output of the current address comparator 202 through conductor 226, and the output of the first address comparator 216 through conductor 228. The output of the logic circuit 230 is connected to the chip enable input of the ROM, such that the logic circuit 230 selectively enables the operation of ROM 110. If the output of the current address comparator 202 is a low logic level, indicating that the current instruction is not in the secured address range, the output of logic circuit 230 has a low logic level enabling operation of the ROM 110. This low level signal on a chip enable input of the internal ROM 110 will enable the internal ROM. If the output of the current address comparator 202 is high logic level, indicating that the current instruction is in the secured address range, then either one of the following two conditions must be met for the ROM to be enabled. Either the previous address comparator 210 must output a high logic level, indicating that the previous program counter address is in the secured address range, or first address comparator 216 must have high logic level, indicating that the current instruction address in program counter 204 is the first address of a secured operation. Otherwise, operation of the ROM 110 is disabled.

An alternate embodiment of the ROM security logic is illustrated in FIGS. 3–5. The security logic includes a first address comparator 216 (FIG. 3) coupled to a first address register 218 via a bus 220 and to program counter 204 via bus 203. The first address register stores the first address of each secured operation. The first address comparator 216 outputs a high logic level when the program counter address matches a first address stored in the first address register, as described above. Current address comparator 202 is coupled to a secured address range register 206 via a bus 205 and to the program counter 204 via bus 203. The current address comparator 202 compares the program counter address to the secured address range stored in register 206. If the address is outside of the secured address range, the output of the current address comparator 202 has a low logic level. Otherwise the output of the current address comparator 202 has a high logic level.

A power supply circuit 302 (FIG. 3) is coupled by conductor 306 to the output of first address comparator 216 and by conductor 304 to the output of current address comparator 202. The power supply circuit 302 is connected to the power supply input of internal ROM 110 by conductor 318 and selectively connects conductors 310 and 318 to supply power to ROM 110 as a function of the output of comparators 202 and 216.

The power supply circuit 302 includes RS flip-flop 402 (FIG. 4). The S input of the RS flip-flop 402 is connected to conductor 306. The R input of RS flip-flop 402 is connected to conductor 304 via an inverter 404. The Q-not output of RS flip-flop 402 is connected to one input of an ANDgate 408. The other input of ANDgate 408 is connected to the output of inverter 404. The Q output of RS flip-flop 402 and the output of ANDgate 408 are connected to respective inputs of ORgate 410. The output of the ORgate is connected to the gate of a MOSFET switch 426. The source and drain of the MOSFET switch 426 are connected between the power supply Vs for the ROM 110 and conductor 318, connected to the voltage supply input of ROM 110.

In operation, RS flip-flop 402 toggles between a secure state and an unsecured state. When the signal on conductor 306 has a high logic level, indicating that the program counter address is the beginning address of a secure operation, then the signal on conductor 304 also has a high logic indicating that the program counter address is in the secured address range. The S input is thus 1 and the R input 0, which sets the Q output to a high logic level, as shown in FIG. 5. The ORgate 410 passes this high logic level through to the MOSFET gate, holding the MOSFET in a conductive state. The Q output will remain in this high logic level until the flip-flop is reset. The flip-flop 402 is reset when the signals on conductors 306 and 304 are both low level signals, which occurs when the program counter does not have a signal in the secure address range. The S input then has a value of 0 and the R input has a value of 1. This puts the Q output to a value of 0, the Q-not output to a value of 1, and the inverter 404 output to a value of 1. Consequently, the output of ANDgate 408 will have a high logic level, which signal is passed through the ORgate 410 to the gate of MOSFET switch 426.

If the signal on conductor 304 changes to a high logic level, without conductor 306 changing to a high logic level, indicating a secure address is to be executed without first executing the beginning address instruction, the S input will have a value of 0, the R input will have a value of 0. The outputs of the RS flip-flop will not change state (see FIG. 5). Additionally, the output of ANDgate 408 will change to a 0. Consequently, the output of the ORgate 410 will have a low logic level, and the MOSFET will be in nonconductive state, cutting off the supply of power to the ROM. The ROM is thus disabled.

It will be recognized that the output of ORgate 410 can be connected to ROM 110 to enable and disable the ROM in the same manner as the output of the logic circuit 230 in FIG. 2. Alternatively, the output of the logic circuit 230 in FIG. 2 can drive the gate of MOSFET 426. It will also be recognized that the ANDgate 408 and the ORgate 410 can be eliminated form the circuit of FIG. 4 where the secured address range is the entire address range of the ROM. In this embodiment, the Q output of RS flip-flop 402 drives the gate of MOSFET 426 such that the ROM is disabled whenever code is being executed which is not stored in ROM 110.

An EEPROM security circuit 600 (FIG. 6) selectively enables the operability of EEPROM 109. The circuit includes a comparator 601 connected to program counter 204 via bus 203. The comparator compares the program counter address to the address range for ROM 110 (FIG. 1). If the program counter address is in the ROM address range, the output of the comparator has a high logic level. The output of the comparator is connected to a logic circuit 606 via a conductor 604. The logic circuit also receives an EEPROM read/write (R/W) signal on a conductor 602. The EEPROM R/W signal is a signal generated internally by microcontrollers to indicate when the CPU is reading from or writing to the EEPROM. The output of the logic circuit 606 is connected to EEPROM 109 through conductor 120. The logic circuit only enables the EEPROM for a write cycle if the program counter is within the range of the internal ROM 110 addresses. Consequently, the EEPROM can only be programmed while executing instructions stored in the internal ROM 110. Alternately, the logic circuit 606 can disable the EEPROM whenever the program counter 204 is not in the ROM address range. This prevents the EEPROM from being read, or written to, when the microcontroller is not executing a program in the ROM 110.

Figure 7:
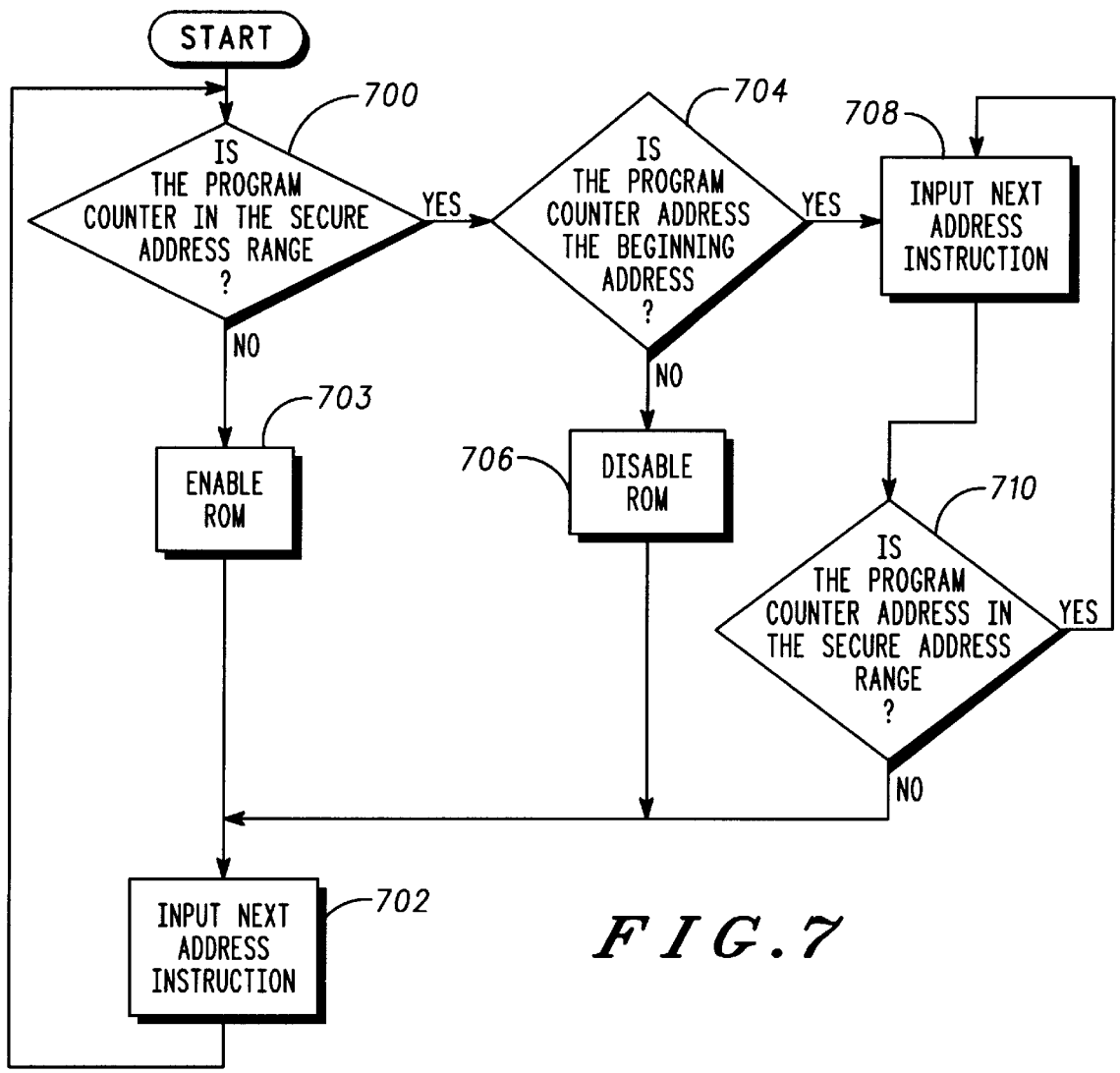
FIG. 7 is flow chart illustrating an alternate embodiment employing a processor implemented security logic.

Although the ROM and EEPROM security logic are described as being implemented using discrete circuits, those skilled in the art will recognize that it is preferably integrated into the microcontroller chip. It is also envisioned that the security logic 116 may be implemented using a digital processor. If a digital processor is used, the digital processor determines if the program counter 204 address is in the secured operating range, as indicated in block 700 of FIG. 7. If the program counter is not in the secured address range, the processor enables the internal ROM 110, as indicated in block 703. This insures that ROM 110 is enabled if the microcontroller 100 has returned to the unsecured address range after ROM 110 was disabled. The digital processor next inputs the instruction at the next program counter (PC) address, as indicated in block 702. If the program counter is not in the secure address range, the digital processor determines if the program counter address is in the beginning address of the secured address range, as indicated in decision block 704. If not, the processor would disable the ROM, as indicated in block 706. If the address is the first address, the processor will continue to enable the ROM so long as the program counter remains in the secure operation by inputting addresses, as indicated in block 708 and determining if the program counter address is in the secure address range. When the program counter address is no longer in the secure address range, the processor will go to block 702.

Figure 8:
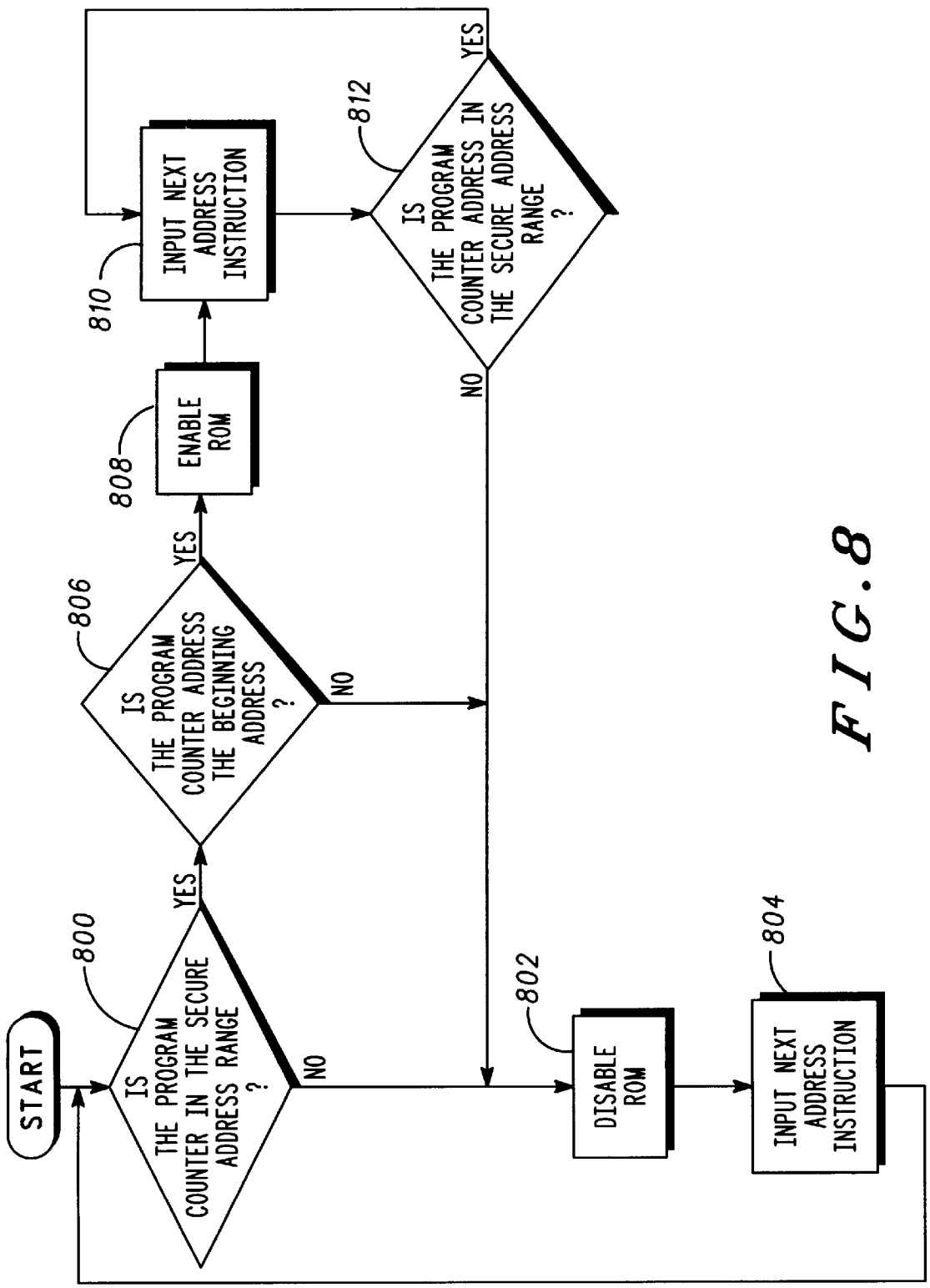
FIG. 8 is flow chart illustrating an alternate embodiment employing a processor implemented security logic.

FIG. 8 illustrates a program for the security logic 116 implemented using a digital processor to disable the internal ROM 110 whenever the internal ROM instructions are not being executed. If the program counter 204 address is not in the secured address range, as determined in block 800, the processor disables the ROM 110, as indicated in block 802. The processor inputs the next address of the program counter 204, as indicated in block 804. The processor continues to operate with the ROM 110 disabled until the program counter is in the ROM address range. When it is determined that the program counter 204 address is in the ROM address range, the processor determines if the program counter address is a beginning address of a secure operation, as indicated in decision block 806. If not, the digital processor returns to decision block 800. If the program counter 204 address is the beginning address of a secure operation, the processor enables ROM 110, as indicated in block 808. The processor will continue to enable the ROM so long as the program counter remains in the secure operation, as determined by inputting addresses in block 810 and determining if the program counter address is in the secure address range in decision block 812. When the program counter address is no longer in the secure address range, the processor will disable the ROM, as indicated in block 802.

Thus it can be seen that an improved security for a microcontroller is disclosed. Improved security is provided for information stored in the microcontroller without substantially increasing the complexity or cost of the microcontroller.

We claim:

1. A microcontroller, comprising:

an address bus;

a data bus;

an external address port connected to said address bus and to said data bus for coupling to an external memory;

an internal ROM storing instructions for a secure operation at an associated address range, said associated address range including a beginning address; and an internal controller coupled to said data bus, said address bus, and said internal ROM, said internal controller controlling execution of said secure operation by executing said instructions, said internal controller preventing execution of said instructions if said secure operation is not initiated by executing an instruction associated with said beginning address.

2. The microcontroller as defined in claim 1, wherein said internal controller includes security logic and a CPU coupled to said security logic.

3. The microcontroller as defined in claim 2, wherein said CPU includes a program counter, and said security logic is coupled to said program counter to monitor said CPU and determine if a current address of said program counter is in said associated address range.

4. The microcontroller as defined in claim 3, wherein said security logic includes circuitry to compare a previous address of said program counter to said associated address range and circuitry to compare said current address to said beginning address, and if said current address is in said associated address range, said previous address is not in said associated address range, and said current address is not said beginning address, said internal controller does not execute instructions in said associated address range.

5. The microcontroller as defined in claim 2, wherein said security logic includes ROM security logic and EEPROM security logic.

6. The microcontroller as defined in claim 5, wherein said microcontroller includes an internal EEPROM, said CPU includes a program counter, and said EEPROM security logic includes circuitry to compare a current address of said program counter to an address range associated with said internal ROM, and disables programming of said internal EEPROM if said CPU is not executing code in said internal ROM.

7. The microcontroller as defined in claim 1, further including a switch connected between a power supply and said internal ROM, said switch coupled to said internal controller and controlled by said internal controller to selectively supply power to said internal ROM, said switch coupled to said internal controller, said power supply, and said internal ROM, said switch disconnecting said power supply from said internal ROM to disable said internal ROM.

8. The microcontroller as defined in claim 1, further comprising a switch coupled to said internal controller, a power supply, and said internal ROM, wherein said internal ROM is powered via said switch and said switch disconnecting said power supply from said internal ROM to disable said internal ROM.

9. A method of securing a microcontroller including an address bus, a data bus, an external port coupled to the address bus and the data bus, an internal controller coupled to the address bus and the data bus, the internal controller including a program counter having a program counter address therein, and an internal ROM coupled to the address bus and data bus, the method comprising the steps of:

determining if a current program counter address is in a secure address range;

determining if a preceding program counter address is in the secure address range; and disabling the internal ROM if the current program counter address and the preceding program counter address are not in the secure address range.

10. The method as defined in claim 9, wherein said step of determining if the current program counter address is in the secure address range includes the step of determining if the current program counter address is a beginning address of the secure address range.

11. The method as defined in claim 10, wherein the step of disabling the internal ROM if the current program counter address and the preceding program counter address are not in the secure address range disables the internal ROM if the program counter enters the secure address range without first executing an instruction associated with the beginning address of the secure address range.

* * * * *